UNITED STATES PATENT OFFICE.

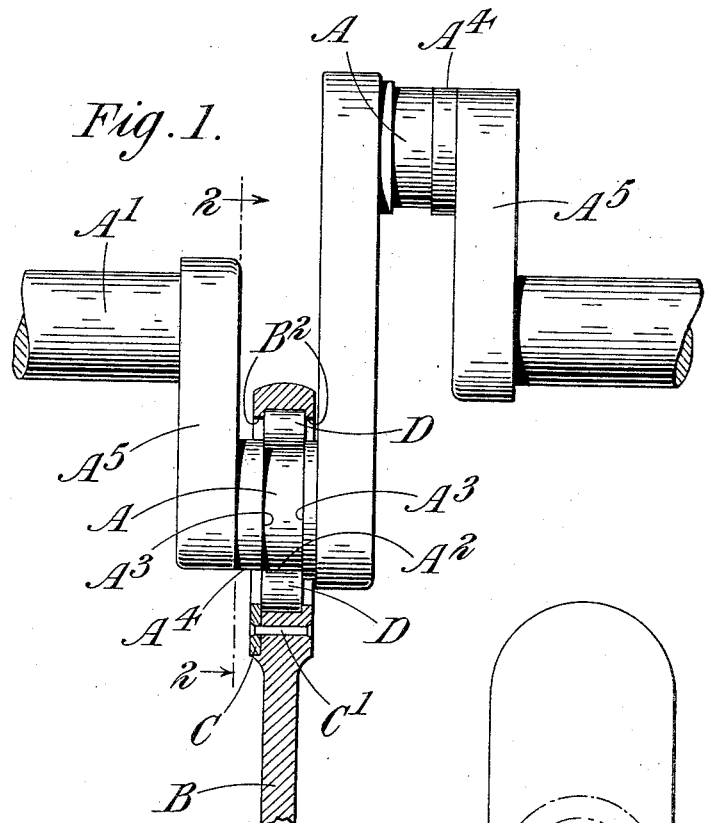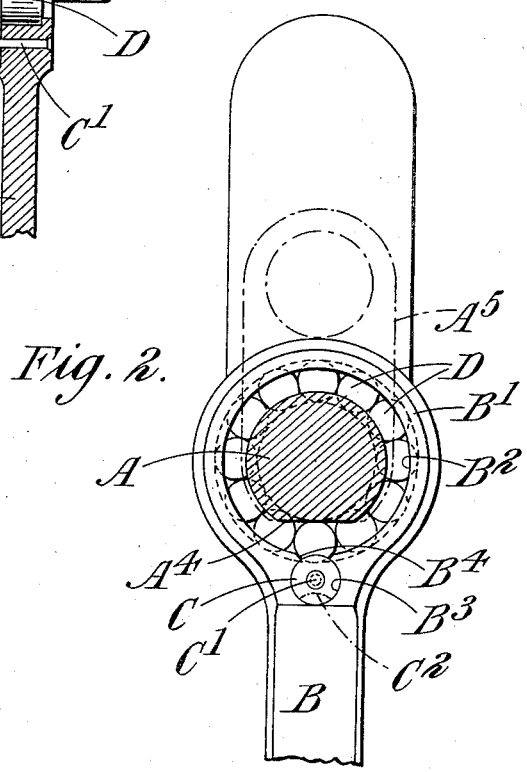

WILLIAM DOUGLAS, OF KINGSWOOD, BRISTOL, ENGLAND.

ROLLER-BEARING.

1,383,292.  Specification of Letters Patent.  Patented July 5, 1921.

Application filed March 4, 1919. Serial No. 280,557.

*To all whom it may concern:*

Be it known that I, WILLIAM DOUGLAS, a subject of the King of England, residing at Kingswood, Bristol, England, have invented certain new and useful Improvements in Roller-Bearings, of which the following is a specification.

This invention is for improvements in or relating to roller-bearings and is particularly applicable to crank and connecting-rod bearings of engines and the like.

In a known type of roller bearing for a connecting-rod and crank-pin, the rollers run on the crank-pin as an inner race, and the undivided big end of the connecting-rod forms the outer race, and is of such dimensions that it can be threaded over the crank web on to the crank-pin. An internal annular recess is provided in the big end of the connecting-rod to form the roller outer race and a gap is made through one of the roller-containing flanges formed on each side of the recess. Through this gap the rollers can be pushed into position when the connecting rod is appropriately placed with reference to the crank-pin, and the gap can be afterward closed by a cover of convenient form.

To facilitate the introduction of the rollers into the race, that end of the outside crank-web which adjoins its crank-pin is made level with, or slightly under the periphery of the said crank-pin.

According to the present invention, in a roller bearing of the type referred to, there is provided in the crank-pin an annular recess of such width and depth as to receive therein with working clearance the portions of the rollers which protrude from the recessed outer race in the connecting-rod, and a gap formed in one of the side-walls of the crank-pin recess, which gap can be registered with the gap in the side-flange of the outer race to thereby provide an opening of a size to admit the rollers between the respective races. By this construction, endwise movement of the connecting rod relative to the crank-pin axis is prevented by the engagement of the ends of the rollers with the side-walls of the respective recesses, and thus knocking caused by the connecting-rod striking the sides of the crank-webs is avoided.

Preferably the gap in the roller-retaining flange of the outer race is closable by means of a disk held in a recess in the body of the connecting-rod, which recess is so disposed and situated that a portion of the disk fills sufficient of the aforesaid gap to prevent passage therethrough of the rollers, with or without a notch or "bite" in the edge of the disk to register with the gap when the disk is rotated for that purpose. In this manner convenient and simple means are provided, by which the gap can be opened and closed at will for the insertion of rollers in the race or their removal therefrom.

In the accompanying drawings which illustrate the manner of carrying out the invention:—

Figure 1 is an elevation of a two-throw crank-shaft with a connecting-rod, in section at its race, in position thereon, and Fig. 2 is an end elevation of Fig. 1 with the crank neck in transverse section on the line 2—2 of Fig. 1, the web of the crank being indicated by chain lines.

In the crank-pin A of the crank shaft $A^1$ is formed a circumferential recess $A^2$ of a depth less than half the diameter of the rollers employed and of a length to provide normal end-clearance for the rollers. The end walls $A^3$ of the recess $A^2$ thus form radial end-flanges for the so constituted inner race.

The eye $B^1$ of the connecting rod B is provided with radial end-flanges $B^2$ integral with the rod. The distance apart of these flanges $B^2$ and their depth correspond with the distance apart and depth respectively of the flanges $A^3$ on the crank neck A.

A portion of one of the end flanges $B^2$ is removed by the formation in the body of the rod of a circular recess $B^3$ of a depth equal to the thickness of the flange $B^2$. The gap $B^4$ so formed is enlarged sufficiently to admit the rollers into the race when the connecting-rod is mounted on the crank-shaft and is so turned thereon as to cause another gap (in this case a flat $A^4$) formed in the corresponding end flange $A^3$ of the crank-pin to register with the aforesaid gap $B^4$. The flat $A^4$ is brought down to the level of the bottom of the recess $A^2$ and extends over the crank web $A^5$. For closing the gap $B^4$ thus formed in the end flange $B^2$, a disk C is provided which fills the recess, and closes the gap $B^4$ sufficiently to prevent the removal of the rollers. When the rollers D are assembled in the races the disk C is secured in the recess by means of a centrally disposed rivet $C^1$ which extends through the disk and the connecting-rod.

The rollers D are inserted in the races by bringing the flat A⁴ in the flange A² of the crank-neck and the gap B⁴ in the end flange B² on the connecting rod into register, which thus provides clearance for the insertion of one roller at a time. As soon as the full number of rollers has been inserted, the gap B⁴ in the end-flange of the connecting rod eye is closed by the means above described.

The manner in which the rollers are thus retained by the end flanges B² in the connecting rod renders it unnecessary to provide a closing means for the gap formed by the flat A⁴ on the shoulder of the crank-pin, but it will be apparent that if desired means for closing the gap therein may also be provided.

The eye B¹ of the connecting rod B is of such a size that it can be threaded along the chank-shaft A¹ and the crank-web A⁵ on to the crank-pin A whereby the crank-shaft can be of one piece instead of being built up.

It will be evident that where a crank-shaft is provided with balance-weights, one balance-weight must be removable to enable the eye of the connecting-rod to pass along the crank-web on to the crank-neck.

In a roller-bearing constructed according to this invention it will be seen that not only is endwise movement of the rollers limited by the radial end-flanges on each of the races but also the relative longitudinal movement of one race to the other. The axial length of the eye of the connecting-rod is such as to provide clearance between it and the crank-webs, thereby preventing knocking due to such end-play as is usually provided.

It will be appreciated that various methods may be employed for closing the gap B⁴ formed in the flange B² and that the invention is not limited to the manner of accomplishing this above described. In one modification the disk C may be rotatably mounted on the rivet C¹ and have a portion C² shown in chain lines removed from its edge like a "bite." When the disk is rotated so that the "bite" registers with the gap in the guide-rings the rollers can be inserted. After insertion of the rollers the disk can be rotated so that the "bite" no longer registers with the gap, and thereafter the rivet may be further clenched to make the disk immovable.

It will be further appreciated that the scope of this invention is not limited to the application of the bearings to the crank and connecting-rod only, but that it may be employed upon any other bearing for which its use would be appropriate.

What I claim as my invention and desire to secure by Letters patent is:—

1. In a roller bearing for a crank and connecting rod the combination with the rollers, of the crank pin having an annular recess of a width and depth to receive the rollers with a working clearance, the eye of the connecting rod having formed therein a race with a gap provided in one of the side flanges of said race, said gap being adapted to be registered with a gap provided in one of the side-walls of the said annular recess so as to provide an opening of a size readily to admit the rollers, and a disk adapted to be placed in said recess for closing the gap in the side flange of the said race thereby preventing endwise movement of the rollers.

2. A construction as specified in claim 1, in which the disk is made rotatable about a central pin and has cut in its periphery a notch adapted to register upon rotation of said disk with the gap in the flange of the outer race to permit the insertion of the rollers therein.

In testimony whereof I have signed my name to this specification in the presence of two subscribing witnesses.

WILLIAM DOUGLAS.

Witnesses:
E. TYLER,
NORMAN LUKE.